United States Patent
Wang et al.

(10) Patent No.: US 11,908,600 B2
(45) Date of Patent: Feb. 20, 2024

(54) PREPARATION DEVICE AND METHOD OF CERAMIC COATING ON A SINTERED TYPE NDFEB PERMANENT MAGNET

(71) Applicant: Yantai Dongxing Magnetic Materials Inc., Yantai (CN)

(72) Inventors: Chuanshen Wang, Yantai (CN); Kunkun Yang, Yantai (CN); Zhongjie Peng, Yantai (CN); Daoning Jia, Yantai (CN); Kaihong Ding, Yantai (CN)

(73) Assignee: Yantai Dongxing Magnetic Materials Inc, Yantai (CN)

( * ) Notice: Subject to any disclaimer, the term of this patent is extended or adjusted under 35 U.S.C. 154(b) by 84 days.

(21) Appl. No.: 17/467,473

(22) Filed: Sep. 7, 2021

(65) Prior Publication Data
US 2022/0076866 A1  Mar. 10, 2022

(30) Foreign Application Priority Data
Sep. 7, 2020  (CN) .......................... 202010930693.X

(51) Int. Cl.
*H01F 1/057* (2006.01)
*H01F 7/02* (2006.01)
*H01F 41/02* (2006.01)

(52) U.S. Cl.
CPC ............. *H01F 1/0577* (2013.01); *H01F 7/02* (2013.01); *H01F 41/0253* (2013.01)

(58) Field of Classification Search
None
See application file for complete search history.

(56) References Cited

U.S. PATENT DOCUMENTS

2011/0033609 A1*  2/2011  Jiang ....................... C23C 24/08
                                                                 427/2.26
2017/0050222 A1   2/2017  Miao et al.
(Continued)

FOREIGN PATENT DOCUMENTS

CN  1900361 A   1/2007
CN  107282343 A  10/2017
(Continued)

OTHER PUBLICATIONS

Corresponding JP application first search result dated Jun. 21, 2022.
Corresponding EP search results dated Jan. 27, 2022.

*Primary Examiner* — Xiaowei Su
(74) *Attorney, Agent, or Firm* — Gang Yu

(57) ABSTRACT

The disclosure relates to a preparation device and method of forming a ceramic coating on a sintered type NdFeB permanent magnet. The preparation device comprises a holding barrel, a pump body, a spraying system, and a fixture mechanism. The pump body is connected with the holding barrel and the spraying system and the spraying system is located above the fixture mechanism and there is a distance between the spraying system and the fixture mechanism. The fixture mechanism is connected with a recovery bucket through a pipeline, and the recovery bucket is connected with the holding barrel through the pipeline. The spraying system comprises a nozzle, wherein the inlet of the nozzle is connected with the pipeline of the pump body. The fixture mechanism comprises a support plate, an upper recovery trough plate and a lower recovery trough plate, wherein the lower recovery trough plate is located above the support plate.

10 Claims, 1 Drawing Sheet

(56) References Cited

U.S. PATENT DOCUMENTS

| | | | |
|---|---|---|---|
| 2017/0062103 A1* | 3/2017 | Wu | H01F 41/0293 |
| 2017/0263380 A1* | 9/2017 | Mino | H01F 41/0293 |

FOREIGN PATENT DOCUMENTS

| | | | |
|---|---|---|---|
| CN | 107931062 | A | 4/2018 |
| CN | 108581183 | A | 9/2018 |
| CN | 110828099 | A | 2/2020 |
| CN | 111299002 | A | 6/2020 |
| IN | 105386000 | A | 3/2016 |
| JP | 2016122861 | A | 7/2016 |
| KR | 101442559 | B1 | 9/2014 |
| WO | 2011108704 | A | 6/2013 |

\* cited by examiner

PREPARATION DEVICE AND METHOD OF CERAMIC COATING ON A SINTERED TYPE NDFEB PERMANENT MAGNET

TECHNICAL FIELD

The disclosure relates to the field of sintered type NdFeB permanent magnet processing, in particular to a preparation device and method of ceramic coating on a sintered type NdFeB permanent magnet.

BACKGROUND

NdFeB permanent magnets are indispensable for current industrial power, including applications in new energy vehicles, air-conditioning compressors, wind turbines, robots, etc. Since NdFeB permanent magnet is made of metal such as neodymium, iron, boron and rare earth materials through metallurgical methods, it has poor corrosion resistance and high temperature resistance.

Since NdFeB contains active rare earth metal neodymium, it has poor corrosion resistance and high temperature resistance, especially in high temperature or warm and humid environment. Generally speaking, NdFeB will undergo chemical corrosion (oxidation-reduction reaction between the metal surface and the material in contact) and electrochemical corrosion (electrochemical reaction between the metal surface and the ion-conducting medium (water). The oxidation of the magnet is not obvious in a dry environment at room temperature, but the electrochemical potentials between the phases are different in a high temperature or warm and humid environment, and the gap is large, which forms a corrosion micro-battery and produces intergranular corrosion. The electrode potential of Nd is the most negative (anode), and the main phase is the cathode, forming the characteristics of a large cathode and a small anode. Nd has a large current density, and the corrosion is grid-like, which accelerates corrosion. Nd is chemically active and has many structural defects. Active ions such as chloride ions will adsorb on the grain boundary, causing preferential corrosion of the grain boundary. One of the excellent properties of NdFeB is that its material has a higher anisotropy field, and the most important thing is to rely on its structure to achieve the excellent performance. Affected by high temperature and corrosion, this severely shortens the service life of NdFeB permanent magnets, resulting in poor stability and reliability in usage. Therefore, the anti-corrosion and high temperature resistance of neodymium iron boron permanent magnets have become necessary problems to be solved.

Patent literatures CN 207391536 U, CN 109652798 A use plasma spraying to form $Al_2O_3$-$T_2$ composite ceramic coating on the surface of NdFeB permanent magnet. However, plasma spraying carrier gas is expensive, requires high quality of sprayed materials, and the process is more complicated. The processing technique has many parameters controlled and the cost is high. Patent CN 107931062 A uses the method of electrostatic spraying of polypropylene, polyethylene and polystyrene with amine curing agents, accelerators and lubricants to form an anticorrosive coating on the NdFeB permanent magnet. Patent CN 102397835 A adopts epoxy resin, film forming agent, film aid and nano-ceramics to make coatings form anticorrosive coatings by coating. The defects based on the above are as following: The formed ceramic coating is actually an organic composite coating containing ceramic components. The coating is not ceramic, containing organic components, and has poor high temperature resistance.

SUMMARY

For overcoming deficiencies of the prior art, the present disclosure provides a preparation device as defined in claim 1 and method of forming a ceramic coating on a sintered type NdFeB permanent magnet as defined in claim 4. It mainly solves the insulation, high temperature resistance, and corrosion resistance characteristics of the NdFeB permanent magnet.

Further embodiments of the disclosure could be learned from the dependent claims and following description.

DETAILED DESCRIPTION OF THE EMBODIMENTS

Figure 1:
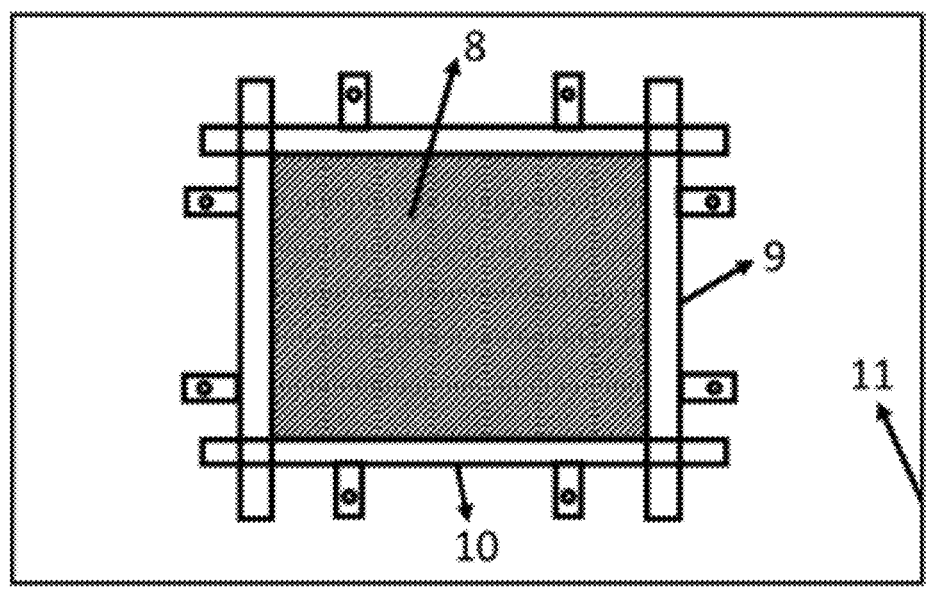
FIG. 1 is an illustration of the structure.
Figure 2:
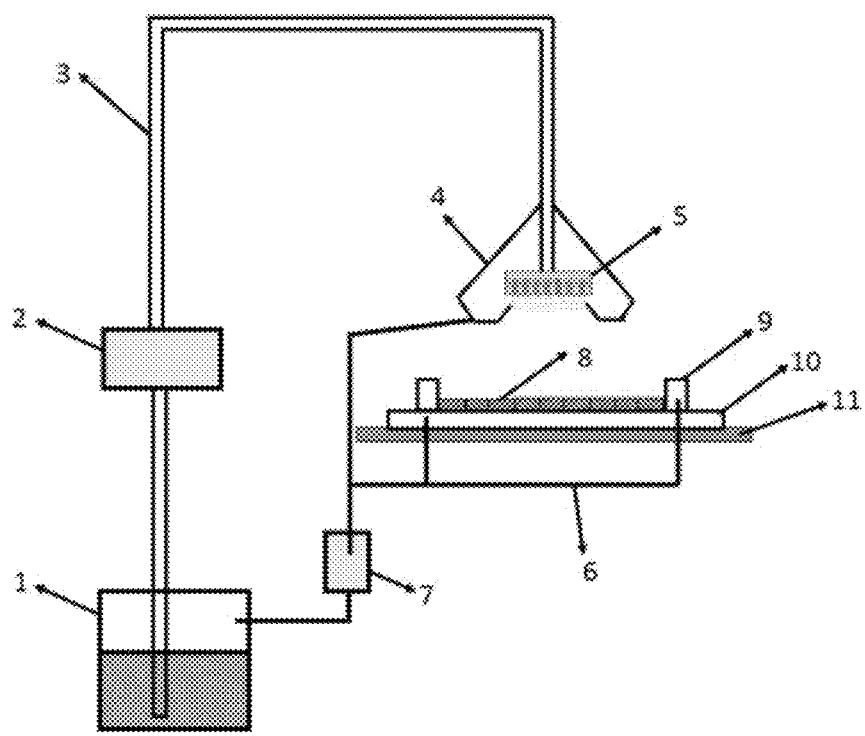
FIG. 2 is the sprayed surface of NdFeB permanent magnets.

The principles and features of the disclosure are described below, and the examples are only intended to be illustrated and not to limit the scope of the disclosure as defined by the present claims.

The preparation device of the present application is to spray a layer of ceramic coating precursor precisely on the surface of sintered type NdFeB permanent magnet, heating ceramic coating precursor to form organic ceramic coating, then forming composite ceramic coating after high temperature cracking treatment. The disclosure adopts the method of combining high precision spraying equipment and slurry recovery, improves the utilization efficiency of ceramic precursor, the efficiency reaches more than 90%, reduces the waste of ceramic precursor liquid and ensures the thickness uniformity of the magnet ceramic, and greatly improves the anti-corrosion performance, high temperature resistance and wear resistance of the magnet. In this method, ceramizable polysilazane or modified polysilazane is used in combination with ceramic materials, and the performance of the prepared ceramic coating is more excellent, including excellent corrosion resistance, high temperature resistance, and wear resistance. Meet the current requirements of NdFeB permanent magnets.

Thus, there is provided a preparation device for ceramic coating on a sintered type NdFeB permanent magnet. The device comprises a holding barrel 1, a pump body 2, a spraying system, and a fixture mechanism. The pump body 2 is connected with the holding barrel 1 and the spraying system and the spraying system is located above the fixture mechanism. There is a distance between the spraying system and the fixture mechanism. The fixture mechanism is connected with the recovery bucket 7 through the pipeline, and the recovery bucket 7 is connected with the holding barrel 1 through the pipeline.

Furthermore, the spraying system comprises a nozzle 5, wherein the inlet of the nozzle 5 is connected with the pipeline of the pump body 2.

Furthermore, the fixture mechanism comprises a support plate 11, the upper recovery trough plate 9 and the lower recovery trough plate 10, wherein the lower recovery trough plate 10 is located above the support plate 11, the lower recovery trough plate 10 is symmetrically arranged on both ends of the upper recovery trough plate 9. On both sides of the upper recovery trough plate 9 and the lower recovery trough plate 10 between the formation of a space for placing NdFeB permanent magnet 8. The outlet of the nozzle 5 is located above the containment space of the spraying system.

Furthermore, the outlet of nozzle 5 includes a plurality of ejection points, which are set into a lattice type.

Furthermore, the spraying system also includes an inverted funnel shaped recovery tank 4, the top of the recovery tank 4 is fixed on the pipeline and through the pipeline, or fixed on the top of the nozzle 5, the bottom end both sides of the recovery tank 4 are fixed on both sides of the nozzle 5.

The preparation device comprises a holding barrel 1, a pump body 2, a spraying system, and a fixture mechanism. On one end of the pump body 2 is connected with the holding barrel 1 through a pipeline 1 and the other end is connected to the spraying system through a pipeline 3 and the spraying system is located above the fixture mechanism. There is a distance between the spraying system and the fixture mechanism. The fixture mechanism is connected with the recovery bucket 7 through the pipeline 2, and the recovery bucket 7 is connected with the holding bucket 1 through the pipeline. The recovery barrel 7 is used for collecting the leaked slurry in the clamp mechanism.

The spraying system comprises a nozzle 5, wherein the inlet of the nozzle 5 is connected with the pipeline of the pump body 2.

The fixture mechanism comprises a support plate 11, the upper recovery trough plate 9 and the lower recovery trough plate 10, wherein the lower recovery trough plate 10 is located above the support plate 11, the lower recovery trough plate 10 is symmetrically arranged on both ends of the upper recovery trough plate 9. On both sides of the upper recovery trough plate 9 and the lower recovery trough plate 10 between the formation of a space for placing NdFeB permanent magnet 8. The outlet of the nozzle 5 is located above the containment space of the spraying system and the support plate 11 is an aluminum plate.

The outlet of nozzle 5 is a plurality of ejection points, which are set into a lattice type.

The spraying system also includes an inverted funnel shaped recovery tank 4, the top of the recovery tank 4 is fixed on the pipeline and through the pipeline, or fixed on the top of the nozzle 5, the bottom end side of the recovery tank 4 is fixed on both sides of the nozzle 5. The recovery tank 4 may also be connected with the recovery barrel 7 through a pipeline to collect the slurry recovered in the recovery tank 4.

Compared to prior art, its distinguishing features and obvious advantages are as follows:

The polymer material which is polysilazane is used for ceramicization, forming a ceramic coating of NdFeB permanent magnet.

There is further provided a method of forming a ceramic coating on a sintered type NdFeB permanent magnet, wherein a layer of a pre-ceramic slurry is sprayed on a surface of sintered type NdFeB permanent magnet, dried and cured by heat-treatment to form the ceramic coating, the method comprising the following steps:

a) Preparing of a pre-ceramic slurry including 10 to 50% polysilazane, 5 to 10% ceramic filler, 30 to 70% organic solvent, 5 to 10% adhesive, and 0 to 1% other additives;

b) Fixing the NdFeB magnet in the preparation device as defined in claim 1;

c) Transferring the pre-ceramic slurry formed in step a) to the nozzle of the preparation device through the pump body, wherein the nozzle vertically sprays the pre-ceramic slurry on a surface of the NdFeB magnet and wherein a distance between the nozzle and the NdFeB magnet is 5 to 50 mm; and d) Drying the pre-ceramic coating on the sprayed surface of the NdFeB magnet and curing the dried pre-ceramic coating to a ceramic coating by heat-treatment.

Steps b) through d) may be repeated for coating al remaining surfaces of the NdFeB magnet.

According to one embodiment, before step a), the surface of the NdFeB permanent magnet is degreased, the degreased surface is cleaned with pure water, the surface is cleaned with 3% to 5% nitric acid solution, the surface is cleaned with pure water, ash is removed with ultrasonic wave, the surface is dehydrated with 99% alcohol, and the surface is dried in an oven at 50 to 60° C.

According to another embodiment, the NdFeB permanent magnet is a square NdFeB permanent magnet or a special-shaped NdFeB permanent magnet.

Polysilazanes are silicon-based polymers containing alternating silicon and nitrogen atoms in their backbone. When thermally treated at temperatures above 400° C., in a process generally called pyrolysis, these materials can be converted into ceramics, such as $Si_3N_4$, SiON, SiCN, SiCNO, or SiC depending on the chemical composition of the polymer and on the pyrolysis atmosphere. Owing to this capability, polysilazanes are used as precursors in the processing of ceramic coatings by the so-called polymer-derived ceramic (PDC) route.

According to another embodiment, the ceramic filers include one or more of silicon oxide, alumina, titanium oxide, magnesium oxide, zinc oxide, iron oxide, zirconia, tungsten oxide, tungsten carbide, boron carbide, silicon carbide, titanium carbide, silicon nitride, zirconium boride, titanium boride, and rare earth oxides.

According to another embodiment, the organic solvent is an ester compound, ether compound, alicyclic hydrocarbon compound, or aliphatic hydrocarbon compound.

According to another embodiment, the adhesive is an epoxy resin, acrylic acid, silicone, polyurethane, rubber or a mixture thereof. Preferably, the adhesive is an epoxy resin.

According to another embodiment, drying of the pre-ceramic coating is performed at a temperature of 50 to 400° C. for 0.1 to 1 h and curing the pre-ceramic coating is performed at a temperature of 400 to 750° C. for 0.5 to 4 h. A thickness of the ceramic coating may be 5 to 35 μm.

The ceramic coating, which is formed using the above-mentioned device and method, has the following advantages:

1. By using the ultra-high precision spraying process, the utilization rate is as high as 95%, which can greatly save costs.
2. The NdFeB permanent magnet has surface coverage of uniform thickness.
3. The coating provides high temperature and corrosion resistance.

Example 1

NdFeB permanent magnets are treated by the following process:

a. Degrease the surface of the NdFeB permanent magnets, first clean with pure water, then clean with 4% nitric acid, clean with pure water, ultrasonic deash, and then put in 99.8% alcohol for dehydration, and use a blower to blow dry.

b. Put the cleaned NdFeB permanent magnets into an oven for drying at a temperature of 60° C. for 30 minutes.

c. Place the NdFeB permanent magnets between the two upper recovery trough plates 9 and the lower recovery trough plate 10 of the preparation device to form an accommodation space for the NdFeB permanent magnets 8 to be sprayed.

d. Prepare a pre-ceramic slurry including 30 wt. % of a polysilazane, 5 wt. % epoxy resin as an adhesive 1, 60 wt. % cyclohexane as an organic solvent, 4.5 wt. % of a 1:1 mixture of silicon carbide and alumina as ceramic filler, and 0.5% other additives and impurities.

e. Put the prepared slurry into the holding barrel, open the pump body, spray a coating layer on the surface of the NdFeB permanent magnet, and dry the sprayed magnet at 200° C.

Then spray the other surfaces with the slurry and again dry the NdFeB permanent magnet at 200° C.

Cure the dried pre-ceramic coating to a ceramic coating in an oven at 500° C. for 2 h.

According to an exemplary embodiment, the thickness of the ceramic coating was about 20 μm. A performance test of the coated NdFeB permanent magnet showed improved characteristics: neutral salt spray test for 710 h, demagnetization test 0.006% at the temperature of 150° C. for one hour, no scratches in the cross-cut test, and good wear resistance.

Example 2

NdFeB permanent magnets are treated by the following process:

a. Degrease the surface of the NdFeB permanent magnets, first clean with pure water, then clean with 4% nitric acid, clean with pure water, ultrasonic deash, and then put in 99.8% alcohol for dehydration, and use a blower to blow dry.

b. Put the cleaned NdFeB permanent magnets into an oven for drying at a temperature of 50° C. for 35 minutes.

c. Place the NdFeB permanent magnets between the two upper recovery trough plates 9 and the lower recovery trough plate 10 of the preparation device to form an accommodation space for the NdFeB permanent magnets 8 to be sprayed.

d. Prepare a pre-ceramic slurry including 10 wt. % of a polysilazane, 10 wt. % acrylic resin as an adhesive 1, 30 wt. % butyl acetate, 40 wt. % 2-Butoxyethanol as an organic solvent, 9 wt. % of a 2:1 mixture of zinc oxide and zirconia as ceramic filler, and 1% other additives and impurities.

e. Put the prepared slurry into the holding barrel, open the pump body, spray a coating layer on the surface of the NdFeB permanent magnet, and dry the sprayed magnet at 180° C.

Then spray the other surfaces with the slurry and again dry the NdFeB permanent magnet at 180° C.

Cure the dried pre-ceramic coating to a ceramic coating in an oven at 400° C. for 4 h.

According to an exemplary embodiment, the thickness of the ceramic coating was about 15 μm. A performance test of the coated NdFeB permanent magnet showed improved characteristics: neutral salt spray test for 690 h, demagnetization test 0.008% at the temperature of 150° C. for one hour, no scratches in the cross-cut test, and good wear resistance.

Example 3

NdFeB permanent magnets are treated by the following process:

a. Degrease the surface of the NdFeB permanent magnets, first clean with pure water, then clean with 4% nitric acid, clean with pure water, ultrasonic deash, and then put in 99.8% alcohol for dehydration, and use a blower to blow dry.

b. Put the cleaned NdFeB permanent magnets into an oven for drying at a temperature of 55° C. for 30 minutes.

c. Place the NdFeB permanent magnets between the two upper recovery trough plates 9 and the lower recovery trough plate 10 of the preparation device to form an accommodation space for the NdFeB permanent magnets 8 to be sprayed.

d. Prepare a pre-ceramic slurry including 50 wt. % of a polysilazane, 5 wt. % a polyurethane as an adhesive 1, 39 wt. % 2-hydroxy-benzoicacimethylester, as an organic solvent, 5 wt. % of a 1:2 mixture of tungsten carbide and titanium oxide as ceramic filler, and 1% other additives and impurities.

e. Put the prepared slurry into the holding barrel, open the pump body, spray a coating layer on the surface of the NdFeB permanent magnet, and dry the sprayed magnet at 250° C.

Then spray the other surfaces with the slurry and again dry the NdFeB permanent magnet at 250° C.

Cure the dried pre-ceramic coating to a ceramic coating in an oven at 600° C. for 3 h.

According to an exemplary embodiment, the thickness of the ceramic coating was about 35 μm. A performance test of the coated NdFeB permanent magnet showed improved characteristics: neutral salt spray test for 750 h, demagnetization test 0.005% at the temperature of 150° C. for one hour, no scratches in the cross-cut test, and good wear resistance.

Example 4

NdFeB permanent magnets are treated by the following process:

a. Degrease the surface of the NdFeB permanent magnets, first clean with pure water, then clean with 4% nitric acid, clean with pure water, ultrasonic deash, and then put in 99.8% alcohol for dehydration, and use a blower to blow dry.

b. Put the cleaned NdFeB permanent magnets into an oven for drying at a temperature of 60° C. for 20 minutes.

c. Place the NdFeB permanent magnets between the two upper recovery trough plates 9 and the lower recovery trough plate 10 of the preparation device to form an accommodation space for the NdFeB permanent magnets 8 to be sprayed.

d. Prepare a pre-ceramic slurry including 50 wt. % of a polysilazane, 5 wt. % a silicone as an adhesive 1, 40 wt. % ethyl acetate, as an organic solvent, 4 wt. % of a 1:1 mixture of silicon oxide and titanium oxide as ceramic filler, and 1% other additives and impurities.

e. Put the prepared slurry into the holding barrel, open the pump body, spray a coating layer on the surface of the NdFeB permanent magnet, and dry the sprayed magnet at 200° C.

Then spray the other surfaces with the slurry and again dry the NdFeB permanent magnet at 200° C.

Cure the dried pre-ceramic coating to a ceramic coating in an oven at 750° C. for 0.5 h.

According to an exemplary embodiment, the thickness of the ceramic coating was about 20 μm. A performance test of the coated NdFeB permanent magnet showed improved characteristics: neutral salt spray test for 650 h, demagnetization test 0.004% at the temperature of 150° C. for one hour, no scratches in the cross-cut test, and good wear resistance.

What is claimed is:

1. A preparation device for ceramic coating on a sintered NdFeB permanent magnet, the preparation device comprising a holding barrel, a pump body, a spraying system, and a fixture mechanism,
   wherein the pump body is connected with the holding barrel and the spraying system and the spraying system is located above the fixture mechanism and there is a distance between the spraying system and the fixture mechanism;
   the fixture mechanism is connected with a recovery bucket through a pipeline, and the recovery bucket is connected with the holding barrel through the pipeline; the spraying system comprises a nozzle, wherein the inlet of the nozzle is connected with the pipeline of the pump body;
   the fixture mechanism comprises a support plate, an upper recovery trough plate and a lower recovery trough plate, wherein the lower recovery trough plate is located above the support plate, the lower recovery trough plate is symmetrically arranged on both ends of the upper recovery trough plate; and
   the outlet of the nozzle is located above a containment space of the spraying system.

2. The method of claim 1, wherein the outlet of nozzle is a plurality of ejection points, which are set into a dot-matrix structure.

3. The method of claim 1, wherein the spraying system also includes an inverted funnel shaped recovery tank, the top of the recovery tank is fixed on the pipeline and through the pipeline, or fixed on the top of the nozzle, the bottom end side of the recovery tank is fixed on both sides of the nozzle.

4. A method of forming a ceramic coating on a sintered NdFeB permanent magnet, wherein a layer of a pre-ceramic slurry is sprayed on a surface of the sintered NdFeB permanent magnet, dried and cured by heat-treatment to form the ceramic coating, the method comprising the following steps:
   a) Preparing of a pre-ceramic slurry including 10 to 50% polysilazane, 5 to 10% ceramic filler, 30 to 70% organic solvent, 5 to 10% adhesive, and 0 to 1% other additives;
   b) Fixing the NdFeB magnet in the preparation device as defined in claim 1;
   c) Transferring the pre-ceramic slurry formed in step a) to the nozzle of the preparation device through the pump body, wherein the nozzle vertically sprays the pre-ceramic slurry on a surface of the NdFeB magnet and wherein a distance between the nozzle and the NdFeB magnet is 5 to 50 mm; and
   d) Drying the pre-ceramic coating on the sprayed surface of the NdFeB magnet and curing the dried pre-ceramic coating to a ceramic coating by heat-treatment.

5. The method of claim 4, wherein before step a), the surface of the NdFeB permanent magnet is degreased, sequentially treating the degreased surface: the degreased surface is cleaned with pure water, the surface is cleaned with 3% to 5% nitric acid solution, the surface is cleaned with pure water, ash is removed with ultrasonic wave, the surface is dehydrated with 99% alcohol, and the surface is dried in an oven at 50 to 60° C.

6. The method of claim 4, wherein NdFeB permanent magnet is a square NdFeB permanent magnet or an irregular shaped NdFeB permanent magnet.

7. The method of claim 4, wherein ceramic fillers include one or more of silicon oxide, alumina, titanium oxide, magnesium oxide, zinc oxide, iron oxide, zirconia, tungsten oxide, tungsten carbide, boron carbide, silicon carbide, titanium carbide, silicon nitride, zirconium boride, titanium boride, and rare earth oxides.

8. The method of claim 4, wherein the organic solvent is an ester compound, ether compound, alicyclic hydrocarbon compound, or aliphatic hydrocarbon compound.

9. The method of claim 4, wherein adhesive is an epoxy resin, acrylic acid, silicone, polyurethane, rubber or a mixture thereof.

10. The method of claim 4, wherein drying of the pre-ceramic coating is performed at a temperature of 50 to 400° C. for 0.1 to 1 h, curing the pre-ceramic coating is performed at a temperature of 400 to 750° C. for 0.5 to 4 h, and a thickness of the ceramic coating is 5 to 35 μm.

* * * * *